Nov. 21, 1944.      D. E. FRITZ      2,363,310
DELAYED-START CONNECTION FOR ELECTRIC MOTORS
Filed July 14, 1942
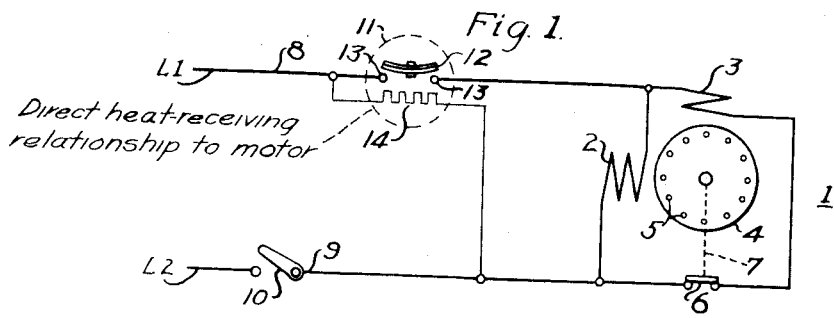
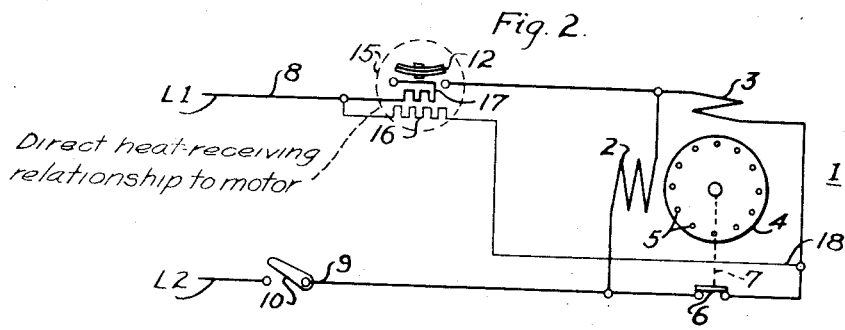
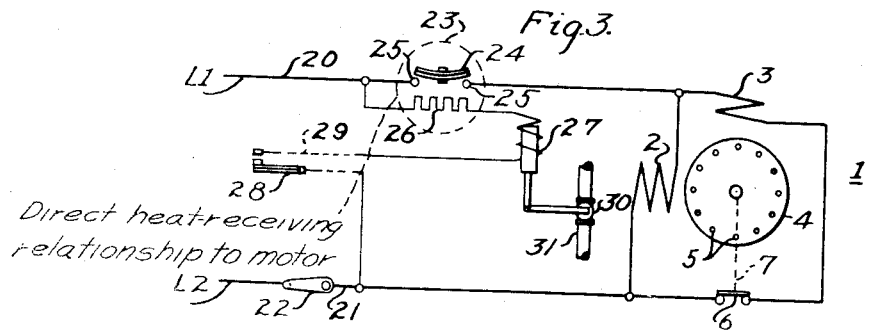
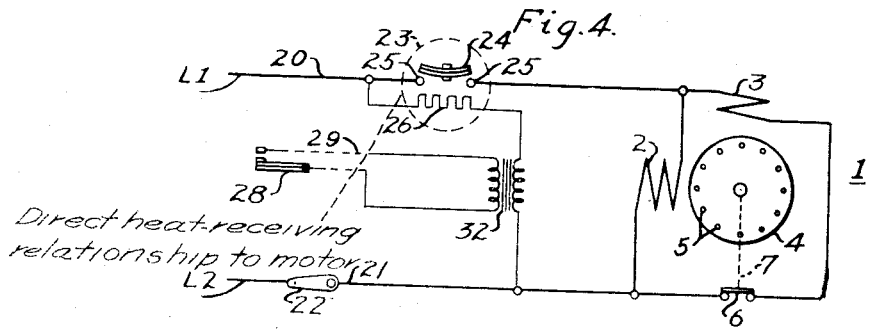
WITNESSES:
INVENTOR
Dwain E. Fritz.
BY O. B. Buchanan
ATTORNEY Patented Nov. 21, 1944

2,363,310

UNITED STATES PATENT OFFICE 2,363,310

DELAYED-START CONNECTION FOR ELECTRIC MOTORS

Dwain E. Fritz, Wapakoneta, Ohio, assignor to Westinghouse Electric & Manufacturing Company, East Pittsburgh, Pa., a corporation of Pennsylvania Application July 14, 1942, Serial No. 450,844

8 Claims. (Cl. 172—279)

The present invention relates to self-starting single-phase electric motors and, more particularly, to a connection or control means for delaying the starting of such motors for a predetermined time interval after the motor terminals are energized, and also for delaying the stopping of such motors.

The delayed-start connection means of the present invention is especially adapted for use with electric motors used for driving fans or blowers in unit heaters. Such heaters require a certain time to become heated after the gas, or other heating means, is ignited or energized, and it is not desirable to start the fan in operation until the heater has become sufficiently heated, so as to avoid blowing cold air into the room. For this reason, it is desirable to delay the starting of the motor which drives the fan for a certain time interval after the heater itself has been energized, and this is most conveniently done by providing for a time delay in the starting means or control of the motor.

The principal object of the present invention is to provide a simple and reliable time-delay connection means for causing an electric motor to start in operation, or to become energized, at a predetermined time after energy has been applied to the motor terminals.

A more specific object of the invention is to provide a time-delay connection for delayed starting of electric motors which includes a thermally-responsive switch of the type in which the contacts are normally open, and which has a heating element for heating it to the temperature at which the contacts close to energize the motor, the switch being mounted in direct heat-receiving relation to the motor, so that when the motor is initially hot the time-delay will be less. This is a desirable feature in unit heater applications, since, if the heater has previously been in operation and still retains some heat, less time is required for it to become sufficiently hot, and it is, therefore, desirable to reduce the time-delay in starting the motor.

Another object of the invention is to provide a delayed-start connection for the control of electric motors which includes a thermally-responsive switch for energizing the motor, and in which the switch has a heating element, the energization of which is under the control of an external control device which is responsive to the temperature of a room to be heated, or of some other external condition.

A further object of the invention is to provide a delayed-start connection for the control of electric motors in which a thermally-responsive switch is utilized to effect energization of the motor, and in which the starting and stopping of the motor are controlled by controlling the energization of the heating element of the switch, so as to obtain a delayed stopping of the motor, as well as a delayed starting. A delayed stopping of the motor is desirable in unit heater applications, since, after the gas is turned off, or the heating means otherwise deenergized, considerable heat remains in the heater which is wasted if the fan stops simultaneously with the deenergization of the heater. By providing a delayed stopping of the motor, however, the fan continues in operation for a short time to blow this heat into the room and thus avoid wasting it.

A still further object of the invention is to provide control means for an electric motor and associated equipment, in which a thermally-responsive switch is used to obtain a delayed starting of the motor, and in which an external control device responsive to the temperature of a room, or other external condition is used to control the energization of a heating element for the switch and also to effect actuation of equipment associated with the motor, such as the burner of a unit heater, so as to obtain completely automatic operation, together with delayed starting and stopping of the motor.

The invention will be more fully understood from the following detailed description, taken in connection with the accompanying drawing, in which:

Figures 1 to 4, inclusive, are schematic diagrams showing various embodiments of the invention.

Figure 1 shows a simple embodiment of the invention for the delayed starting of a single-phase motor 1. Any suitable type of single-phase motor may be used in this circuit. The motor shown for the purpose of illustration is of the split-phase type, having a main primary winding 2 and an auxiliary or starting primary winding 3, which are displaced from each other on the stator frame of the motor and which are so designed that their currents are displaced in phase. The motor also has a rotor member 4 which carries a suitable secondary winding 5, shown as a squirrel-cage winding. A centrifugal or other type of speed-responsive switch 6 is connected in the circuit of the auxiliary winding 3, and is arranged to be actuated by the rotor 4 when the motor reaches a predetermined speed of rotation, as indicated by the dotted connection 7, so as to disconnect the auxiliary winding 3 after the motor has accelerated to the predetermined speed.

The motor 1 has line terminals 8 and 9, and a suitable line switch 10 is provided for connecting the motor to a single-phase supply line L1, L2. In order to effect the desired time-delay in starting the motor, a thermally-responsive switch 11 is connected in series in one of the motor terminals. The switch 11 is of the so-called "inverted" thermostatic type, in which the contacts are normally open and which closes its contacts when the switch is heated to a predetermined temperature. Thus, as shown in the drawing, the switch consists of a bimetallic element 12, which is preferably a disc, or other snap-acting device, and contacts 13, which are bridged by the bimetallic element 12 when it is heated above a predetermined temperature. The thermally-responsive switch 11 is preferably mounted in direct heat-receiving relation to the motor 1, as by mounting it directly on the motor frame, and it also has additional heating means for heating it independently of heat from the motor. This heating means preferably comprises an electric heating element 14, which is connected directly across the motor terminals 8 and 9 on the line side of the thermally-responsive switch 11.

The operation of this delayed-start connection should now be apparent. To start the motor, the line switch 10 is closed to energize the motor terminals 8 and 9 from the supply line, but the motor itself is not energized because the thermally-responsive switch 11 is open. Closing of the line switch 10, however, also connects the heating element 14 directly across the line L1, L2, so that current flows through the heating element and it begins to generate heat. The heat produced by the heating element 14 raises the temperature of the bimetallic element 12, and after a predetermined time interval, which may be of the order of thirty to sixty seconds, for example, the bimetallic element 12 reaches the temperature at which it operates, and bridges the contacts 13, completing the connection of the motor windings to the line so that the motor starts.

Thus, if the burner of a unit heater is ignited at the same time that the fan motor line switch 10 is closed, which is the customary arrangement, the motor does not start until a definite time interval has elapsed and no air is blown through the heater until it has had time to become heated. In case the heater has previously been in operation, so that some heat still remains in it, the motor will also be warm, and since the thermally-responsive switch 11 is in direct heat-receiving relation to the motor, it will not take as long for the bimetallic element 12 to become heated to its operating temperature, and the time-delay period is accordingly reduced, which is desirable under these conditions as it does not take the heater as long to become sufficiently hot.

Another embodiment of the invention is shown in Fig. 2. The motor 1 shown in this figure is identical to that shown in Fig. 1, and its terminals 8 and 9 are connected to the line in the same way. The thermally-responsive switch 15 connected in series with the line terminal 8 is generally similar to the switch 11 described above, and has an electric heating element 16 similar to the heating element 14, but it also has a smaller auxiliary heating element 17. The heating element 16 is connected across the line, one end of the heating element 16 being connected on the line side of the thermally-responsive switch 15, while the other end is connected between the speed-responsive switch 6 and the auxiliary motor-winding 3, as indicated at 18. The auxiliary heating element 17 is connected in series with the contacts of the thermally-responsive switch 15.

In the operation of this embodiment of the invention, the heating element 16 is energized when the line switch 10 is closed, since it is connected directly across the supply line through the speed-responsive switch 6, which is closed when the motor is at rest. The heating element 16, therefore, supplies heat to the bimetallic element 12, and when the element 12 has reached its operating temperature after a predetermined time delay, the contacts of the switch 15 are closed and the motor starts to accelerate. When the motor has reached a predetermined speed, the speed-responsive switch 6 operates to disconnect the auxiliary winding 3 from the line, and this operation of the switch 6 also disconnects the heating element 16, which is connected on the motor-winding side of the switch 6. The auxiliary heating element 17, however, is connected in series with the thermal switch 15, so that it is energized by closure of the switch contacts. The heating element 17 is designed to provide sufficient heat to keep the temperature of the thermal switch 15 above its operating temperature, so that its contacts remain closed and the motor remains connected to the line. It will be seen, therefore, that this embodiment of the invention is similar in its operation to that shown in Fig. 1, but that the main heating element 16 is disconnected after the thermal switch 15 has been initially heated up, and a small auxiliary heating element is used during operation of the motor to provide sufficient heat to keep the thermal switch contacts closed.

Fig. 3 shows another embodiment of the invention in which a delayed stopping of the motor is obtained, as well as delayed starting, and in which the operation of the motor and, if desired, associated equipment such as a unit heater burner, can be made completely automatic. The motor 1 shown in Fig. 3 is similar to the motors previously described, although this arrangement may be used with any type of single-phase motor. The motor 1 has line terminals 20 and 21 which are connected to the supply line L1, L2 and a line switch 22 may be provided to deenergize the entire system when desired, although in this embodiment of the invention the line switch is normally kept closed, since the system operates automatically, and may be omitted.

A thermally-responsive switch 23 is connected in series with the line terminal 20. The thermally-responsive switch 23 may be similar to the switch 11 described above, and has a bimetallic element 24 which is adapted to bridge the normally open contacts 25 when it is heated to a predetermined temperature. The switch 23 is mounted in direct heat-receiving relation to the motor, as previously described, and also has an electrical heating element 26. One terminal of the heating element 26 is connected directly to the motor terminal 20 for connection to the supply line, and the other terminal of the heating element 26 is connected to an impedance means 27. The impedance means 27 is connected to the other motor terminal 21 in series with an automatic switch means 28, which, for the purpose of illustration. is shown diagrammatically as a thermostatic switch which may be responsive to the temperature of a room heated by a unit heater with which the motor 1 is associated to drive the fan. The switch 28 may be placed in a location remote from the motor, as indicated by the dotted connection 29. In order to make the system completely automatic, the impedance means 27 in the illustrated embodiment comprises a solenoid which is arranged to actuate a valve 30 in the gas pipe 31 which supplies the burner of the unit heater.

In the operation of this embodiment of the invention, the line switch 22 is normally kept closed, and the system is under the control of the switch 28. The switch 28 is placed in the room or other space which is to be heated, and when the temperature falls below the desired point, the switch 28 closes its contacts. This connects the heating element 26 and solenoid 27 across the line L1, L2 so that they are energized. The solenoid 27 immediately opens the valve 30 to admit gas to the burner so that the unit heater starts to heat up. The heating element 26 supplies heat to the thermally-responsive switch 23, and after a predetermined time interval, the temperature of the bimetallic element 24 is raised sufficiently so that the switch contacts close and the motor is energized to start driving the fan. Thus, the heater itself is started in operation immediately when the switch 28 closes, and the motor starts after a suitable time-delay. When the switch 28 opens its contacts in response to a rise in the temperature to which it is subjected, the heating element 26 and solenoid 27 are deenergized, and the valve 30 immediately closes to cut off the supply of gas to the unit heater burner. The thermally-responsive switch 23, however, is still hot and some heat remains in the heating element 26, so that the switch 23 does not immediately open its contacts, and the motor 1 continues to run to blow whatever heat remains in the unit heater into the room, so that this heat is not wasted. The thermally-responsive switch 23 begins to cool, however, as soon as the heating element 26 is deenergized, and after a certain time interval its temperature falls to the point at which the contacts open, and the motor is then deenergized and stops.

Thus, in the embodiment of the invention shown in Fig. 3, a delayed stopping of the motor is obtained as well as a delayed start, which is desirable in unit heater applications to avoid waste of the heat remaining in the heater after it is shut off. It is to be understood that various modifications may be made in this form of the invention. Thus, if automatic control of the unit heater burner is not desired, this feature may be omitted and any suitable impedance means used in place of the solenoid 27, or the impedance means might even be omitted entirely, and the switch 28 utilized to connect the heating element 26 directly across the supply line in the same manner as the heating elements of Figs. 1 and 2. The use of the impedance means, however, has the advantage that the heating element 26 does not have to be designed for the full line voltage and can, therefore, be made smaller and cheaper. It is also to be understood that this embodiment of the invention is not necessarily limited to unit heater applications, since the solenoid 27 could be used to actuate any type of apparatus associated with the motor 1, and the switch 28 could be any type of automatically operating switch means responsive to any external condition which it is desired to affect by operation of the motor and its associated equipment. The switch 28 could be replaced by a manually operated switch to effect delayed starting and stopping of the motor if automatic control is not desired, and such manual control could obviously be used either with or without the impedance means 27.

Fig. 4 shows a simplified modification of the embodiment of Fig. 3 which may be used when control of the associated equipment is not desired. In this figure, the motor 1 and thermally-responsive switch 23 are the same as those described above, and the motor terminals 20 and 21 are connected to the line through the normally closed line switch 22 in the same manner. In this embodiment of the invention, the heating element 26 of the thermally-responsive switch 23 is connected across the line in series with an impedance means which consists of a small transformer 32. The heating element 26 is connected in series with one winding of the transformer 32, and the thermostatic switch means 28 is connected directly across the other winding of the transformer. When the switch 28 is open, the effective impedance of the transformer 32 in series with the heating element 26 is so high that only a negligibly small current can flow, and no appreciable amount of heat is generated in the heating element 26. When the switch 28 closes, however, it short-circuits the transformer winding to which it is connected, and the resultant impedance in series with the heating element 26 is greatly reduced, so that the heating element is effectively energized, and a large enough current flows through it to produce the necessary amount of heat to actuate the thermally-responsive switch 23. This embodiment of the invention also gives a delayed stopping of the motor in the same manner as described in connection with Fig. 3, since when the switch 28 opens, the high impedance in the circuit of the heating element 26 reduces the current to a negligible value, but a certain time-delay occurs before the switch 23 cools down to the point at which its contacts open, so that the motor 1 continues to run for a certain time interval after the switch 28 opens. As before, the switch 28 may be any type of automatically operating switch and may be made responsive to any external condition, or the switch 28 may be replaced by a manually operated switch if automatic operation is not desired.

The delayed-start connection of the present invention, which has been described in several embodiments, has numerous practical advantages, particularly in its application to unit heater fan motors. A so-called "inverted" thermostatic switch is used to effect the time-delay, which is readily available commercially in suitable sizes and ratings, and the heating element which is used with this switch is relatively simple and inexpensive to design and produce, so that the cost of the control system is very low. An important advantage of this arrangement is that during the time-delay period the motor windings themselves are not energized. In some delayed-start connections which have previously been used, one or more of the motor windings are energized during the time-delay interval in such a manner that the motor does not start. This energization of the windings causes an objectionable hum, which is picked up and amplified by the large amount of sheet metal customarily present in unit heaters, so that a distinctly objectionable noise is produced. This disadvantage is entirely eliminated in the present invention, since the motor windings are not energized at all until the motor actually starts. The embodiments of the invention shown in Figs. 3 and 4 have the further advantage of providing for a delayed stopping of the motor as well as a delayed starting, and can readily be arranged, as shown in Fig. 3, to provide completely automatic control of the unit heater itself as well as of the motor. It is apparent, therefore, that the arrangement of the present invention has numerous advantages for any application in which delayed starting of an electric motor is desired, and although it has been described specifically with reference to its use with unit heater motors, it will be understood that its usefulness is not necessarily restricted to this application, but that it may be used to advantage in many other applications where the characteristics described are desirable.

It will be apparent that, although certain specific embodiments of the invention have been described for purposes of illustration, the invention is capable of various other embodiments and modifications, and it is to be understood, therefore, that the invention is not limited to the particular arrangements shown, but in its broadest aspects it includes all equivalent embodiments and modifications which come within the scope of the appended claims.

I claim as my invention:

1. A delayed-start and -stop electric motor having a main primary winding and an auxiliary primary winding, means for connecting said windings to a single-phase supply line, said connecting means including a thermally-responsive switch, said switch having contacts which are normally open and being adapted to close its contacts when it is heated to a predetermined temperature, said thermally-responsive switch being located in direct heat-receiving relation to the motor, an electric heating element for said switch, and means for effectively energizing said electric heating element from the supply line and for de-energizing the electric heating element to effect starting and stopping of the motor.

2. A delayed-start and -stop electric motor having a main primary winding and an auxiliary primary winding, means for connecting said windings to a single-phase supply line, said connecting means including a thermally-responsive switch, said switch having contacts which are normally open and being adapted to close its contacts when it is heated to a predetermined temperature, said thermally-responsive switch being located in direct heat-receiving relation to the motor, an electric heating element for said switch, and means for effecting delayed starting and stopping of the motor, said means comprising switch means for connecting said electric heating element to said supply line to be energized therefrom and for disconnecting the electric heating element from the supply line.

3. A delayed-start and -stop electric motor having a main primary winding and an auxiliary primary winding, means for connecting said windings to a single-phase supply line, said connecting means including a thermally-responsive switch, said switch having contacts which are normally open and being adapted to close its contacts when it is heated to a predetermined temperature, said thermally-responsive switch being located in direct heat-receiving relation to the motor, an electric heating element for said switch, and means independent of said connecting means and responsive to an external condition for effectively energizing said electric heating element from the supply line and for deenergizing the electric heating element.

4. A delayed-start and -stop electric motor having a main primary winding and an auxiliary primary winding, means for connecting said windings to a single-phase supply line, said connecting means including a thermally-responsive switch, said switch having contacts which are normally open and being adapted to close its contacts when it is heated to a predetermined temperature, said thermally-responsive switch being located in direct heat-receiving relation to the motor, an electric heating element for said switch, said electric heating element being connected to be energized from said supply line, and temperature-responsive means remote from the motor for controlling the energization of said electric heating element.

5. A delayed-start and -stop electric motor having a main primary winding and an auxiliary primary winding, means for connecting said windings to a single-phase supply line, said connecting means including a thermally-responsive switch, said switch having contacts which are normally open and being adapted to close its contacts when it is heated to a predetermined temperature, said thermally-responsive switch being located in direct heat-receiving relation to the motor, an electric heating element for said switch, impedance means connected in series with said electric heating element, said impedance means and heating element being connected across said supply line to be energized thereby, and means responsive to an external condition for controlling the energization of said electric heating element.

6. A delayed-start and -stop electric motor having a main primary winding and an auxiliary primary winding, means for connecting said windings to a single-phase supply line, said connecting means including a thermally-responsive switch, said switch having contacts which are normally open and being adapted to close its contacts when it is heated to a predetermined temperature, said thermally-responsive switch being located in direct heat-receiving relation to the motor, an electric heating element for said switch, impedance means connected in series with said electric heating element, said impedance means and heating element being connected across said supply line to be energized thereby, and temperature-responsive means remote from the motor for controlling the energization of said electric heating element.

7. A delayed-start and -stop electric motor having a main primary winding and an auxiliary primary winding, means for connecting said windings to a single-phase supply line, said connecting means including a thermally-responsive switch, said switch having contacts which are normally open and being adapted to close its contacts when it is heated to a predetermined temperature, said thermally-responsive switch being located in direct heat-receiving relation to the motor, an electric heating element for said switch, impedance means connected in series with said electric heating element, said impedance means and heating element being connected across said supply line to be energized thereby, and temperature-responsive switch means connected in series with said impedance means and heating element to control their energization.

8. A delayed-start and -stop electric motor having a main primary winding and an auxiliary primary winding, means for connecting said windings to a single-phase supply line, said connecting means including a thermally-responsive switch, said switch having contacts which are normally open and being adapted to close its contacts when it is heated to a predetermined temperature, said thermally-responsive switch being located in direct heat-receiving relation to the motor, an electric heating element for said switch, a solenoid connected in series with said electric heating element, said solenoid being operative to actuate other apparatus associated with the motor, and means responsive to an external condition and disposed remote from the motor for connecting said solenoid and heating element across said supply line to be energized thereby.

DWAIN E. FRITZ.